United States Patent
Musin et al.

(10) Patent No.: US 10,378,971 B2
(45) Date of Patent: Aug. 13, 2019

(54) TEMPERATURE SENSOR

(71) Applicants: UNIVERSITÉ DE MONS, Mons (BE); EMPHASE SPRL, Cambron-Casteau (BE)

(72) Inventors: Frédéric Musin, Cambron-Casteau (BE); Marc Wuilpart, Mons (BE); Patrice Mégret, Hornu (BE)

(73) Assignees: Université de Mons, Mons (BE); Emphase SPRL, Cambron-Casteau (BE)

( * ) Notice: Subject to any disclaimer, the term of this patent is extended or adjusted under 35 U.S.C. 154(b) by 164 days.

(21) Appl. No.: 15/328,740

(22) PCT Filed: Jul. 16, 2015

(86) PCT No.: PCT/EP2015/066327
§ 371 (c)(1),
(2) Date: Jan. 24, 2017

(87) PCT Pub. No.: WO2016/012351
PCT Pub. Date: Jan. 28, 2016

(65) Prior Publication Data
US 2017/0219442 A1 Aug. 3, 2017

(30) Foreign Application Priority Data
Jul. 25, 2014 (EP) .................................. 14178508

(51) Int. Cl.
*G01N 25/18* (2006.01)
*G01K 11/32* (2006.01)

(52) U.S. Cl.
CPC .................... *G01K 11/32* (2013.01)

(58) Field of Classification Search
CPC .... G01J 5/08; G01J 5/0003; G01J 5/02; G01J 5/0862; G01J 5/0821; G01J 5/0896;
(Continued)

(56) References Cited

U.S. PATENT DOCUMENTS 4,863,270 A * 9/1989 Spillman, Jr. .......... G01B 11/18
356/477
5,180,911 A 1/1993 Grossman et al.
(Continued)

OTHER PUBLICATIONS

F. Musin et al.; Speckle velocity sensor for underground infrastructure thermal monitoring; Proceedings Symposium IEEE Photonics Society Benelux Chapter; Nov. 2012; pp. 207-210; XP055160057.
(Continued)

*Primary Examiner* — Gail Kaplan Verbitsky
(74) *Attorney, Agent, or Firm* — Reinhart Boerner Van Deuren P.C.

(57) ABSTRACT

The present invention is related to a method for determining distributed temperature variation of a few mode optical fiber comprising the steps of:—providing a few mode optical fiber;—enlighting a first end of said few mode optical fiber by means of a coherent light source;—determining the interference pattern of coherent light at a second end of the optical fiber;—selecting one maximum of intensity at the second end of the optical fiber by spatially filtering the enlighting at the first end of the optical fiber;—determining the path length of the trajectory of the selected maximum of intensity;—based upon the determined path length of the trajectory of the selected maximum of intensity, determining the temperature variation of the few mode optical fiber.

12 Claims, 11 Drawing Sheets

(58) Field of Classification Search
CPC ........ G01K 13/00; G01K 11/32; G01N 25/18; G01N 21/45; G01M 11/331
USPC .......................... 374/130, 131, 137, 166, 115
See application file for complete search history.

(56) References Cited

U.S. PATENT DOCUMENTS

| | | | |
|---|---|---|---|
| 2008/0291460 A1* | 11/2008 | Khatchaturov .... | G01D 5/35383 356/478 |
| 2009/0260501 A1* | 10/2009 | Kashyap ................ | G01H 9/004 84/297 S |
| 2014/0098361 A1* | 4/2014 | Fini ...................... | G01M 11/331 356/73.1 |

OTHER PUBLICATIONS

F. Musin et al.; Fiber optic temperature and vibration sensor for underground power cables; Proceedings Symposium IEEE Photonics Society Benelux; Dec. 2011, pp. 269-272.

Ivan Martincek et al.; Investigation of intermodal interference of LP01 and LP11 modes in the liquid-core optical fiber for temperature measurements; OPTIK Wissenschaftliche Verlag GmbH, DE, vol. 122; No. 8, May 24, 2010; pp. 707-710.

W. Eickhoff; Temperature sensing by mode-mode interference in birefringent optical fibers; Opitcs Letters, Optical Society of America; US; vol. 6, No. 4; Apr. 1981, pp. 204-206.

Eftimov T A et al.; Sensing with a LP01-LP02 Intermodal Interferometer; Journal of Lightwave Technology, IEEE Service Center, New York, NY, US; vol. 11, No. 12, Dec. 1993; pp. 2150-2156.

Arun Kumar et al.; Studies on a Few-Mode Fiber-Optic Strain Sensor Based on LP01-LP02 Mode Interference; Journal of Lightwave Technology; vol. 19, No. 3; Mar. 2001; pp. 358-362.

Ahmad Safaai-Jazi et al.; Synthesis of Intensity Patterns in Few-Mode Optical Fibers; Journal of Lightwave Technology; vol. 9, No. 9; Sep. 1991; pp. 1047-1052.

W.B. Spillman et al.; Statistical-mode sensor for fiber optic vibration sensing uses, Applied optics, 28(15), 3166-76, Aug. 1, 1989.

Snyder, A.W. & Love, J.D.; (1983) Optical Waveguide Theory; Section 12-1, Waveguides with exact solutions, 239.

* cited by examiner

TEMPERATURE SENSOR

FIELD OF THE INVENTION

The present invention is related to a method for determining distributed temperature of an optical fibre.

Another aspect of the invention is related to a temperature sensor implementing the method of the invention.

BACKGROUND

Thermal monitoring integrated along underground power cables is of high interest for electricity, gas and liquid transport infrastructure management. Failure scenarios like thermal runaway due to soil drying, junction failures, leaks or external mechanical actions can cause heavy damages and injure people. Any unsolved failure can also become very expensive. Moreover, lifetime estimation is of great interest to optimize asset management and forecast investments. Conventional fibre optic temperature monitoring is an efficient tool to tackle those issues but is reserved for strategic infrastructure because of the high cost of the existing solutions (based on Raman and Brillouin scatterings). The scope of application of the invention can also be extended to fire and presence detection.

Sensing systems based on interference pattern disturbance have been widely studied, which allowed the realization of statistical mode sensors as described by Spillman, W., Kline, B., Maurice, L., & Fuhr, P., in article "Statistical-mode sensor for fiber optic vibration sensing uses", in Applied optics, 28(15), 3166-76., 1979 and more recently few-mode fiber sensors as disclosed by Safaai-Jazi, A., & McKeeman, J. C., in article "Synthesis of Intensity Patterns in Few-Mode Optical Fibers", Journal of Lightwave Technology, 9(SEPTEMBER), pp. 1047-1052, 1991 and by Kumar, A., Goel, N. K., & Varshney, R. K., in "Studies on a Few-Mode Fiber-Optic Strain Sensor Based on LP 01 -LP 02 Mode Interference", Journal of Lightwave Technology, 19(3), pp. 358-362, 2001.

This approach was mainly applied to vibration and strain sensing. Temperature sensing based on pattern recognition is rather tricky for three main reasons. Firstly only temperature variation can be measured by usual methods instead of absolute temperature. The temperature is therefore obtained by an integration operation (versus time), which causes error drifts. Secondly discrimination between a heating phase (positive temperature variation) and a cooling phase (negative temperature variation) is not straightforward. Thirdly the discrimination between temperature and vibration effects must be efficient.

SUMMARY OF THE INVENTION

The present invention is related to a method for determining distributed temperature variation of a few mode optical fibre comprising the steps of:
  providing a few mode optical fibre;
  enlighting a first end of said few mode optical fibre by means of a coherent light source;
  determining the interference pattern of coherent light at a second end of the optical fibre;
  selecting one maximum of intensity at the second end of the optical fibre by spatially filtering the enlighting at the first end of the optical fibre;
  determining the path length of the trajectory of the selected maximum of intensity;
  based upon the determined path length of the trajectory of the selected maximum of intensity, determining the temperature variation of the few mode optical fibre.

The first and second ends can either correspond to the proximal and distal ends of the fibre, or alternatively coincide at the proximal end, the distal end acting then as a mirror so that the measured interference pattern at the proximal end is deduced from the light reflected by the distal end of the fibre.

Preferred embodiments of the present invention disclose at least one or a suitable combination of the following features:
  the sign of the temperature variation is determined by measuring the trajectory of the selected maximum of intensity induced by a cyclically heated and cooled fibre section inserted in series in the optical path of the few mode optical fibre;
  the method comprise the step of filtering the path length of the maximum of intensity for suppressing discontinuity of the trajectory induced by vibrations;
  the optical fibre is a monomode fibre at higher wavelengths than a specified wavelength, the coherent light source having a wavelength shorter than said specified wavelength;
  the interference pattern is determined by a camera sensor, preferably a CMOS camera;
  the method comprises the step of temporally integrating the determined temperature variation for determining the spatially integrated temperature of the fibre;
  the fibre comprises a cut or a coupler at a known distance between the proximal and the distal ends, said coupler or cut defining a first and a second fibre portion for determining a temperature variation of the first and second portion of the fibre by measuring the path length(s) of the trajectory of the selected maximum of intensity at both the proximal and the distal ends of the fibre;
  more than one fibre comprising a cut or a coupler are used, the cut or coupler being disposed at different distance of the proximal end, the trajectories of the selected maximum at both ends of each fibre being determined for determining the spatial distribution of the temperature variation;
  the temperature variation is measured along an elongated object, preferably selected from the group consisting of an electric cable, and a gas pipe.

The present invention further discloses an integrated temperature sensor for implementing the method of the invention comprising:
  a coherent light source;
  an optical fibre exhibiting a few mode behaviour at the wavelength of the coherent light source, the proximal end of said optical fibre being optically connected to the coherent light source;
  means for selecting a few mode propagation inducing one single light intensity maximum or two light intensity maxima at the distal end of the optical fibre;
  means for determining in use the path length of said intensity maximum.

Advantageously, said means for selecting the few mode propagation is a spatial filter.

FIGURES

KEY

1: Intermodal interference fiber optic sensor, speckle, few-mode fiber,

DETAILED DESCRIPTION OF THE INVENTION

In the present invention a few mode optical fibre is an optical fibre operated at a wavelength at which more than one propagation mode is allowed, but wherein the number of propagation mode is limited to a value permitting an interference pattern with one or transiently two lobes.
This few modes conditions can be obtained in so called few-modes fibres. Typically, this is obtained by using an optical fibre having less than 30 (preferably less than 12) propagation modes at the used wavelength.

In the present description, the term "lobe" is to be understood as as a contiguous part of the interference pattern whose intensity is larger than a threshold level and which comprises a local maximum of intensity . . .

Preferably, the number of propagation mode is limited to a value permitting only one lobe. Nevertheless, a second lobe can appear transiently.

Temperature affects the light propagation in an optical fibre mainly in two ways: thermal expansion and refractive index variation. Thermal expansion and refractive index modulation are responsible for path length and propagation constant variation, respectively. Considering a multimode fibre and a coherent light source, path length and propagation constant modulations produce a moving interference pattern called speckle when the light beam at the fibre output is projected onto a camera.

Figure 1:
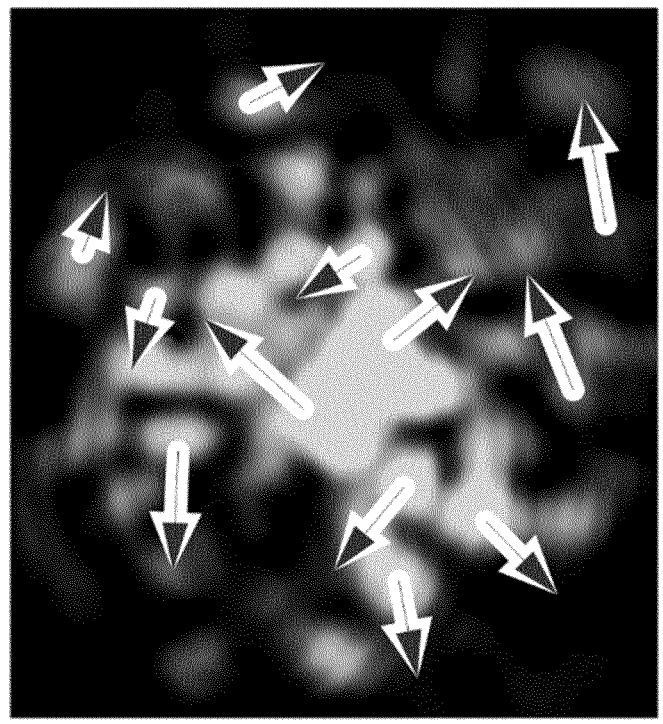
FIG. 1 represents a multiple lobes interference pattern, and the movements of the spots related to temperature variations.
Figure 2:
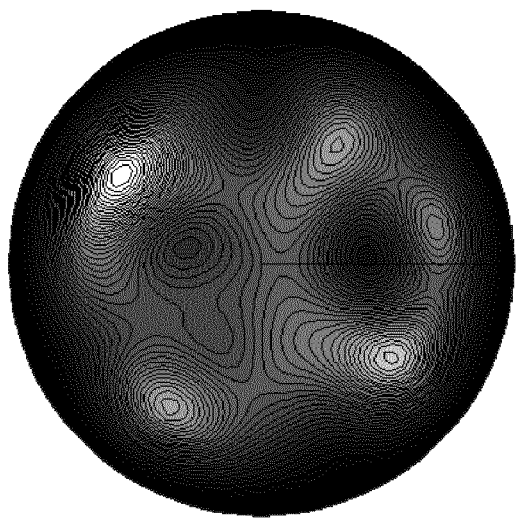
FIG. 2 represents a multiple lobes interference pattern obtained by simulation
Figure 3:
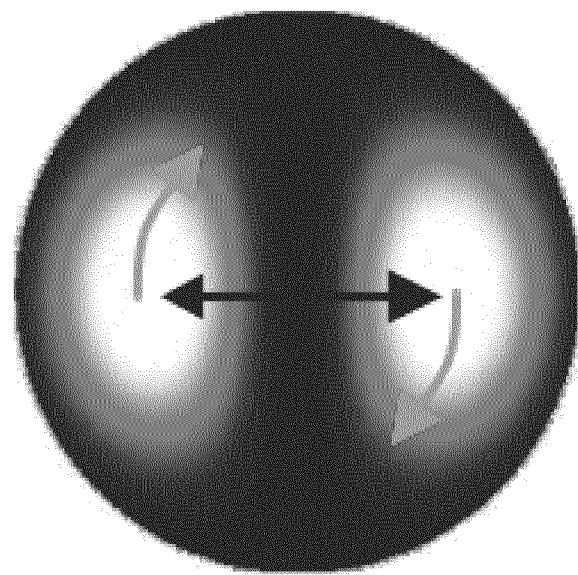
FIG. 3 represents a two lobes interference pattern induced by a few mode propagation.
Figure 4:
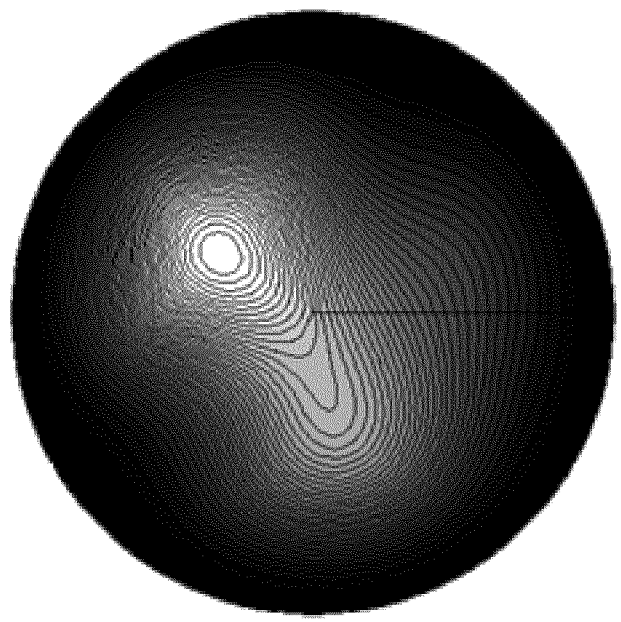
FIG. 4 represents a two lobes interference pattern induced by a few mode propagation obtained by simulation

Moving interference pattern is responsible for modal noise and has been first studied as a detrimental effect. A numerical tool based on development described in Snyder, A. W., & Love, J. D. (1983). Optical Waveguide Theory (Chapman an.), solving the propagation equations for a step-index fibre, has been used in order to compute the interference pattern represented in FIG. 3. Spatial fields are solved in the core of the fibre with the weak guidance assumption and Poynting vector computation leads to the spatial power distribution. The presence of a large amount of modes produces a multiple spot pattern as shown in FIGS. 1 and 2 whereas a few-mode configuration produces a single or a transitorily double lobe interference pattern as shown in FIGS. 3 and 4. The method of the invention for temperature sensing is based on the analysis of a single or double lobes displacement measured for example by a CMOS camera. Few-lobes configuration is more appropriate for efficient image processing. This configuration can be obtained by spatial mode filtering.

It has been observed that the displacement length of the lobes with respect to time depends on temperature variation integrated along the fibre.

As the trajectory of the lobes is reversible (same trajectory upon heating and cooling but in opposite direction), the sign of the temperature variation can be determined by the direction of the velocity of the maximum.

Preferably, the sign of the temperature variation is determined by the use of a fibre section located in the optical path, said section being cyclically heated and cooled. In order to avoid confusion between lobes movements due to this cyclic temperature variation and the temperature variation to be measured, the cycle frequency is at least 2 times higher than the studied phenomenon highest frequency. Preferably, the cycle frequency is 4 times or even more preferably 8 times higher than the highest frequency of the studied phenomenon.

Advantageously, the reversibility of the trajectory and the measurement of the absolute displacement of the lobes compared to an initial position allow to measure absolute temperature difference with an initial temperature. This technique limits drift errors thanks to lobe displacement measurements linked directly to temperature instead of lobe velocity measurements linked to temperature variation. Velocity measurements need indeed integration with respect to time which causes error drift.

Numerical Simulation

Numerical simulations have been performed by selecting HE11 (hybrid modes), TE01 (transverse electrical mode), TM01 (transverse magnetic mode), HE21, HE31, EH11 and HE12 modes of a G.652 fibre exploited at 850 nm, producing a single or transiently a double lobes interference pattern as shown in FIGS. 3 and 4.

Figure 5:
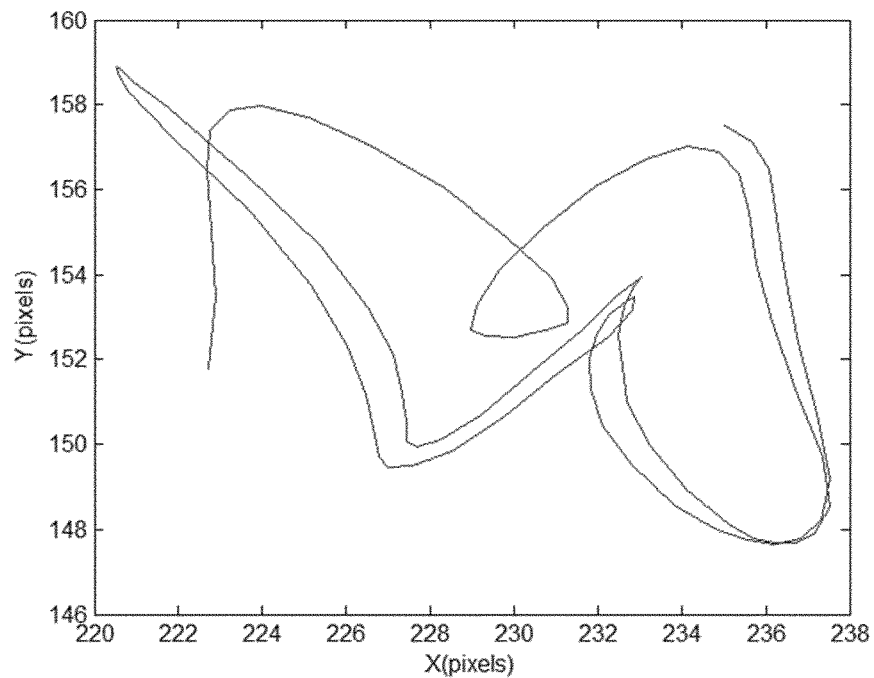
FIG. 5 represents a simulated trajectory of the interference pattern maximum as a function of temperature variation, said simulation being based upon length variation only.
Figure 6:
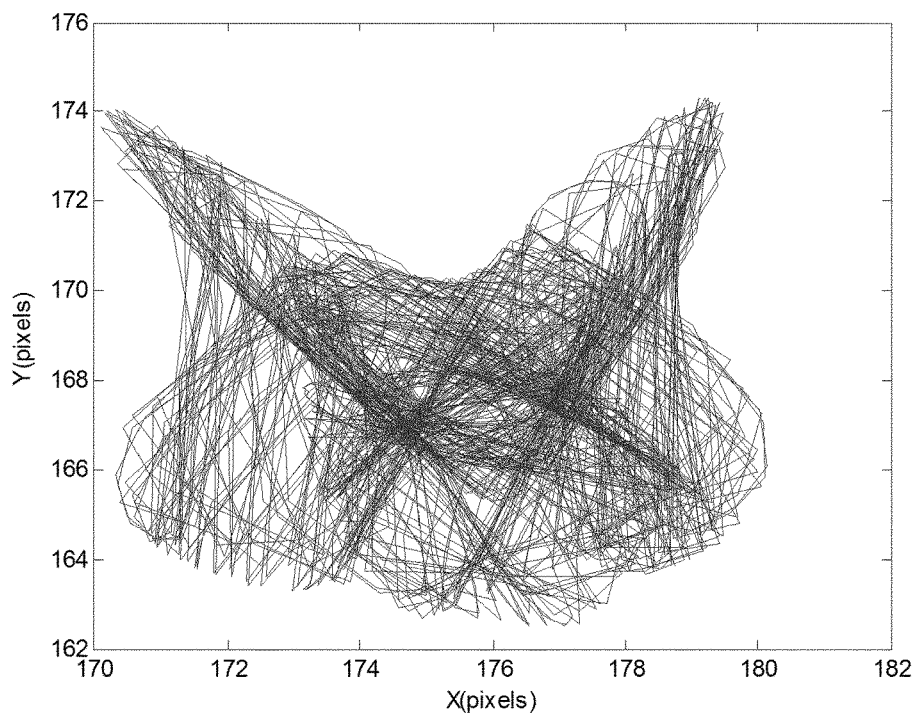
FIG. 6 represents a simulated trajectory of the interference pattern maximum corresponding to a 20 hours simulation.
Figure 7:
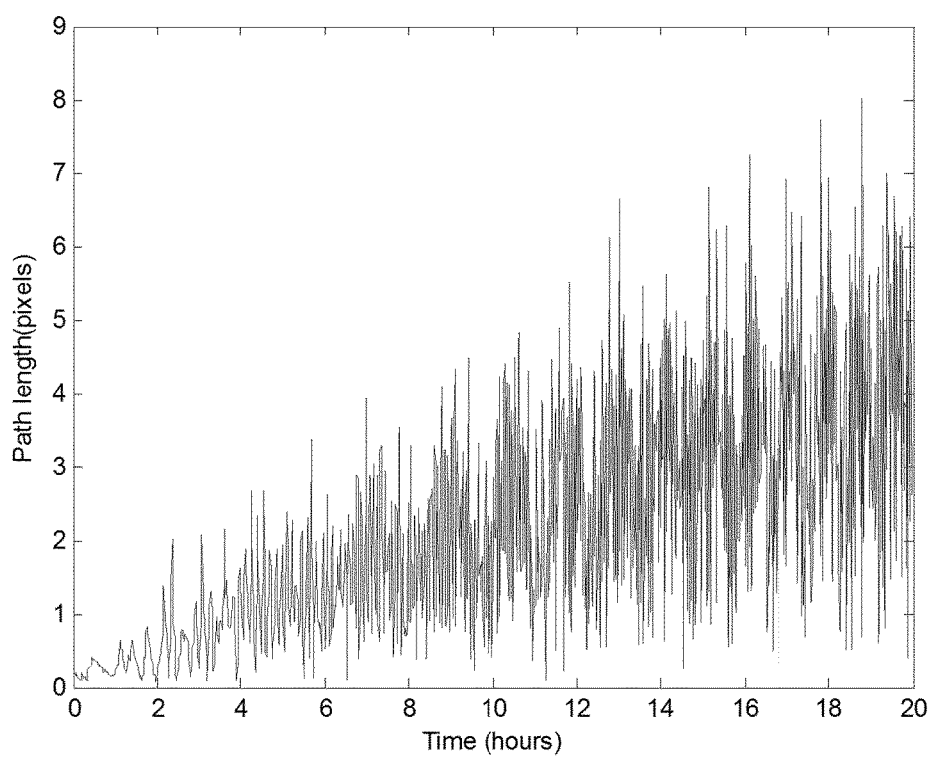
FIG. 7 represents the path length of the interference pattern lobes against time.
Figure 8:
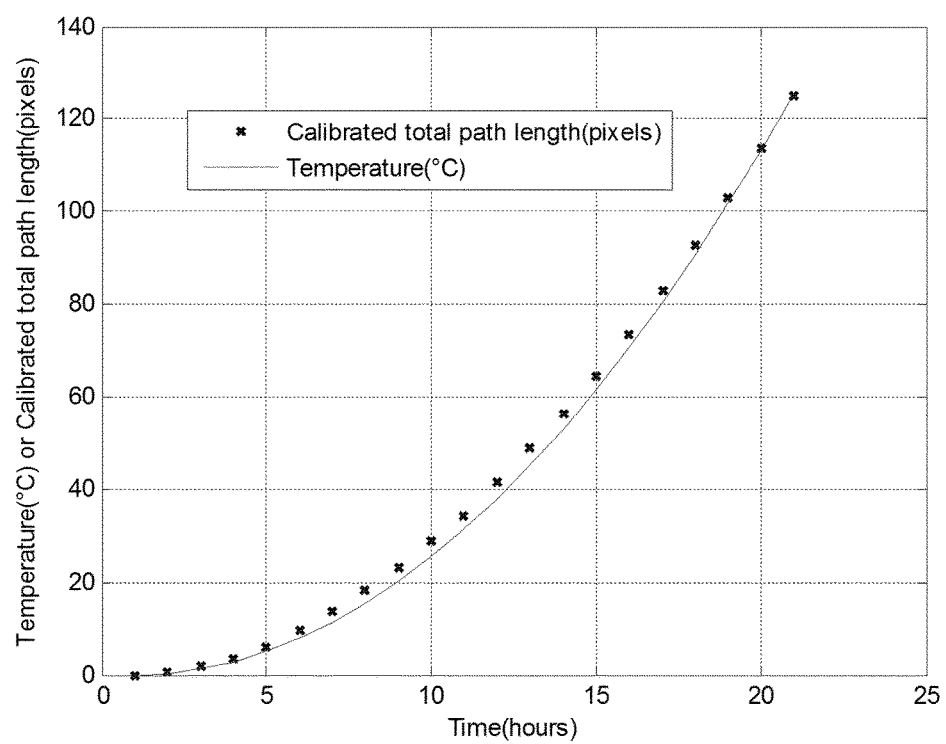
FIG. 8 represents the temperature and the corresponding calibrated total path length of the lobes for a 20 hours simulation.
Figure 9:
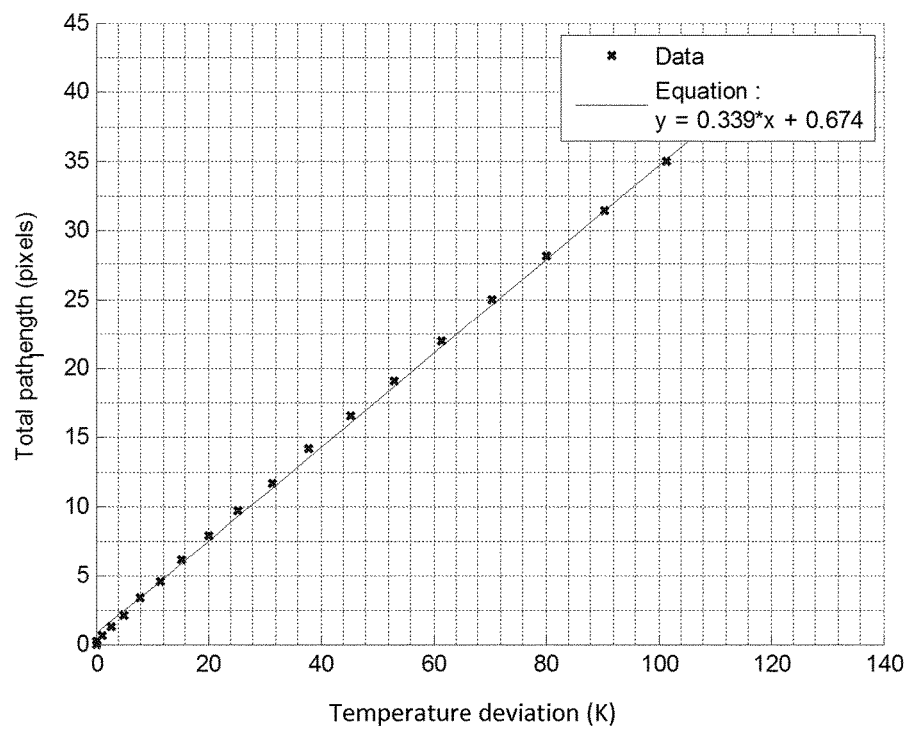
FIG. 9 represents the linear regression between total path length of the lobes and temperature for a 20 hours simulation.

The trajectory of the lobes are presented in FIGS. 5 as an example. To illustrate this, the coordinates of the spot gravity centre have been computed and recorded for temperature variation scheme represented in FIG. 8. The temperature vary from 0 to 140° C. within 20 hours. The resulting trajectory is represented in FIG. 6. This trajectory is built by thresholding the brightness level of the interference pattern image in order to improve the lobes location. Then, the gravity center of the interference pattern is computed in order to locate lobe centers. The resulting path length is presented in FIG. 7. The total path length of the spots is proportional to temperature as it can be seen on linear regression of FIG. 9.

As the trajectory of the lobes is reversible, the sign of the temperature variation can be determined by the direction of the velocity of the maximum (lobe position). The trajectory is processed in order to discriminate heating and cooling thanks to a 20 m fiber section (placed before the sensing fibre, see FIG. 10) cyclically heated and cooled. FIG. 11 illustrates this oscillating effect. Depending on whether the fibre section is cooled or heated, the speed of the lobes is increased or decreased depending on whether the fibre under test is cooled or heated. This imposed movement on the lobes is processed to determine whether the fibre is cooling or heating. The frequency of the imposed movement is chosen ten times higher than the studied phenomenom highest frequency.

Moreover, the reversibility of the trajectory and the measurement of the absolute displacement of the lobes compared to an initial position allow to measure absolute temperature difference with an initial temperature. This technique limits drift errors thanks to lobe displacement measurements linked directly to temperature instead of lobe velocity measurements linked to temperature variation. Velocity measurements need indeed integration with respect to time which causes error drift.

Laboratory Trial

Figure 10:
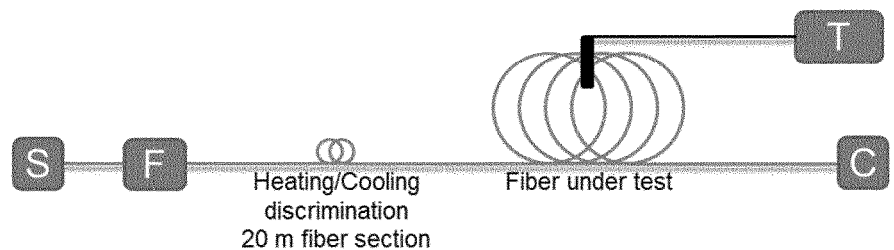
FIG. 10 represents the laboratory setup build to demonstrate the principle of the technique.
Figure 11:
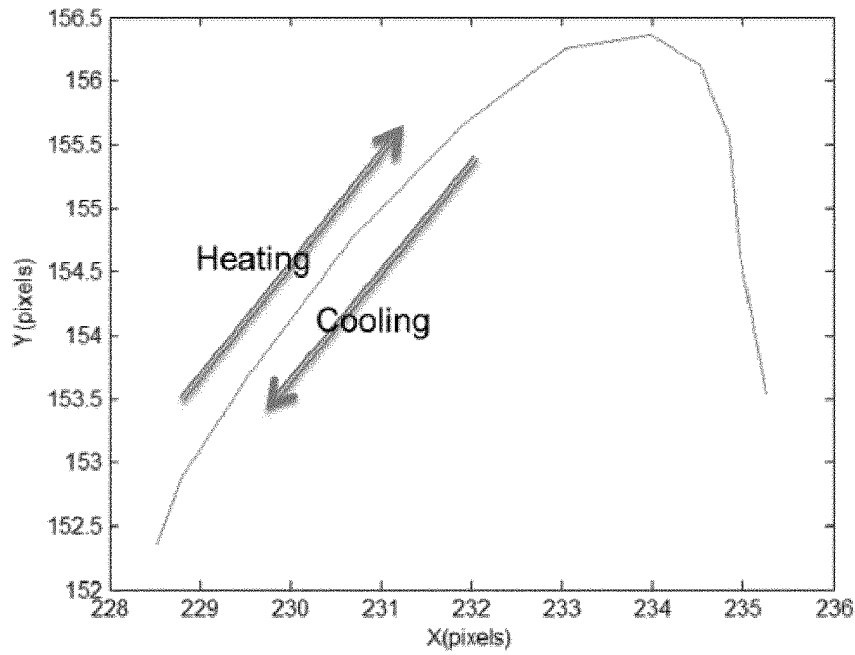
FIG. 11 represents the oscillating effect of the cyclically heated and cooled fiber section inserted in series with the fiber under test.
Figure 12:
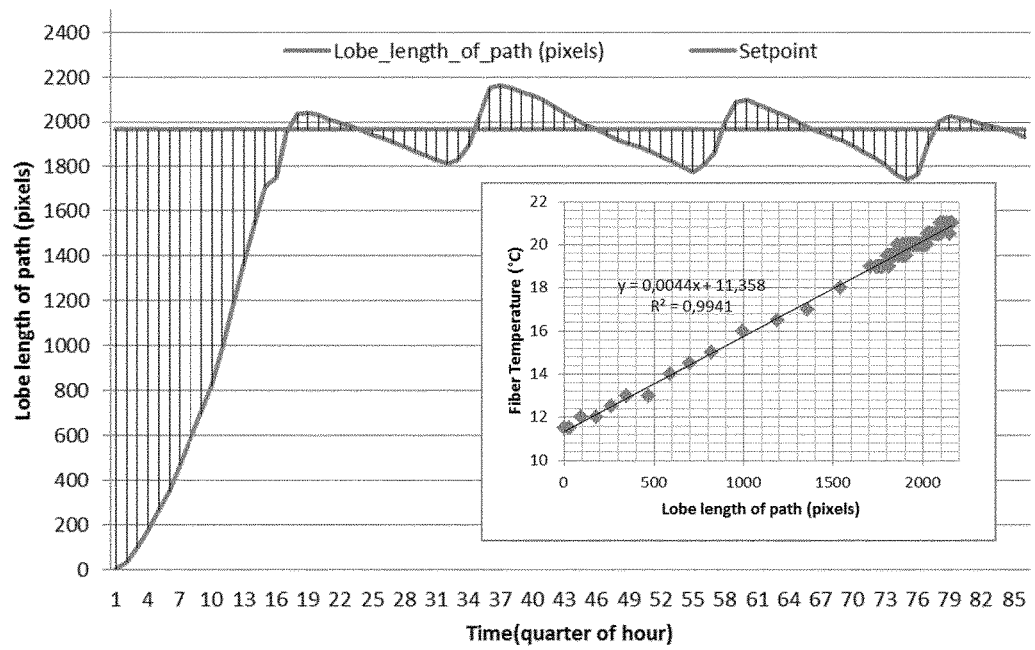
FIG. 12 represents the total lobe length of path for a 24 hours experiment and its linear regression with respect to real measured temperature of a bundle of optical fibre.

As represented in FIG. 10, an experimental setup composed of 200 meters G.652 fibre section used at 850 nm and fully immerged into a temperature controlled water tank leads also to the sensitivity value of 1 pixel/K.m for a projection onto a 200*200 pixels camera and a sample rate of 2 frames per second. FIG. 12 depicts the experimental results over 86 quarters of hour. One can observe that total path length is proportional to temperature difference with respect to the initial temperature of 11.2° C. The oscillations of the calculated temperature around the 20° C. set point are due to cooling and reheating phases by electrical resistances in the water tank (regulation variation around the set point).

Field Trial

Figure 13:
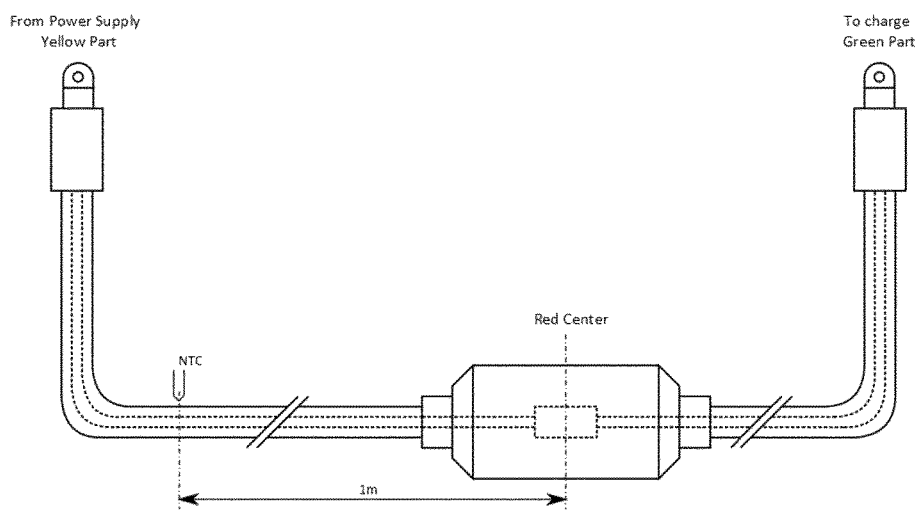
FIG. 13 depicts electrical junction setup
Figure 14:
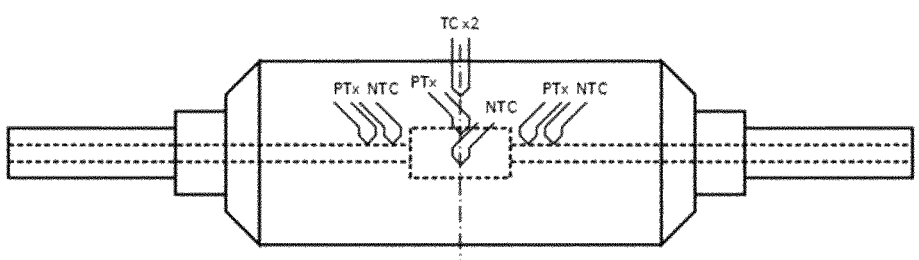
FIG. 14 depicts electrical junction instrumentation

The setup depicted in FIG. 10 has been applied to electrical junctions showing failure behaviour. Three electrical junction have been instrumented as shown in FIGS. 13 and 14. A 5 m long fibre has been wrapped around each junctions. The cable has been loaded by 200 A, 400 A and 600 A during the first 3 hours.

Figure 15:
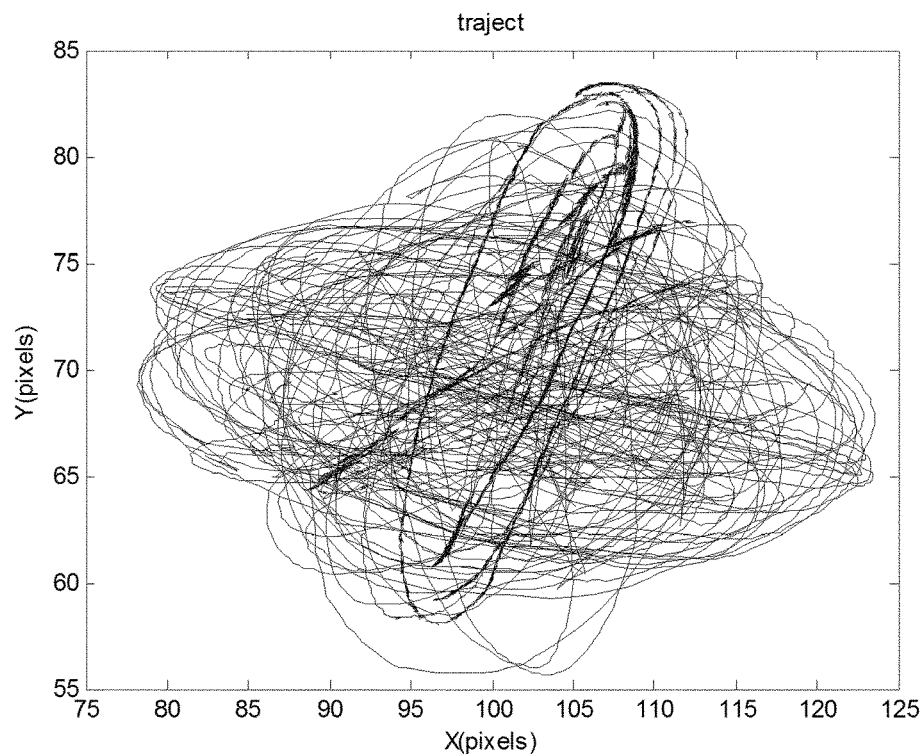
FIG. 15 illustrates the trajectory of the lobes of the interference pattern produced by 5 m of G.652D fibre wrapped around an electrical junction

The setup comprises an 850 nm DFB laser emitting a 1 mW optical power and a spatial mode filtering connector coupled to the fibre input. At the output, a 5 Mpixels camera controlled by an FPGA platform is coupled to the fibre. The image is sampled at 60 frames per second by a PC using a conventional frame grabber and numerically processed. The low-cost objective is reached by using a basic webcam as a camera and a conventional 850 nm laser. Nevertheless, a sufficient coherence length is required to provide a clean interference. The proper line width depends on the distance range and thee fibre intermodal dispersion. A 1 MHz line width has been used, which is enough to extend the range of the technique to 20 km. A special care was also taken to the interference pattern contrast through precise exposure control of the camera. The algorithm can be decomposed in three steps: computation of the image gravity centre, spectral filtering to reduce noise due to mechanical stress on the fibre and trajectory calculation. FIG. 15 shows the recorded lobe trajectory of the interference pattern during 48 hours.

Figure 16:
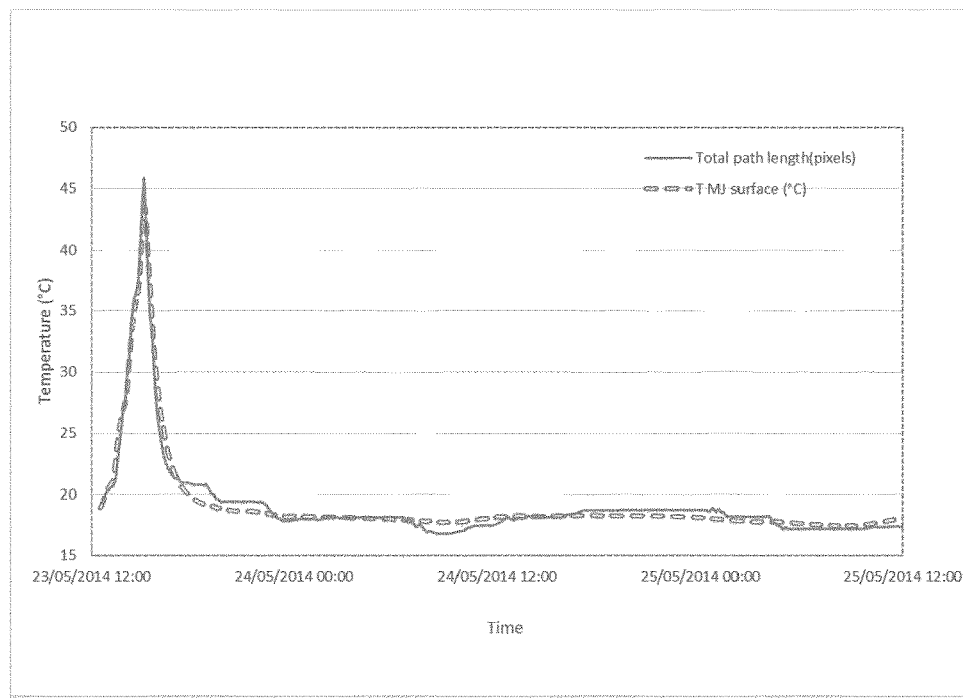
FIG. 16 depicts the thermal monitoring of an electrical junction during 48 hours by an NTC temperature sensor (dashed line) and 5 m of G.652D optical fibre (continuous line)
Figure 17:
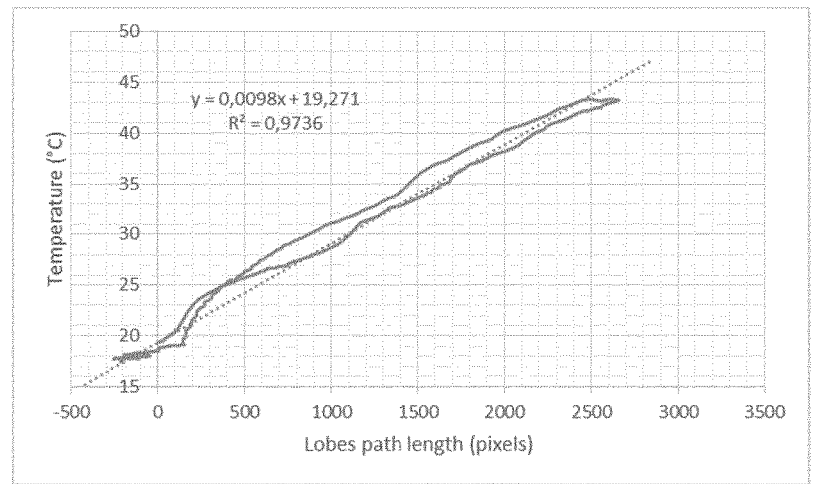
FIG. 17 illustrates the linear regression between measured temperature and lobes path length

Temperatures have been recorded during 48 hours. FIG. 16 shows on one hand the temperature of the junction measured by a conventional temperature sensor and on the other hand calibrated lobes path lengths. FIG. 17 illustrates the linear regression between measured temperature and computed lobes path length. Observed hysteresis can be partially explained by higher sensitivity of the fibre compared to the NTC sensor. As predicted, one can observe that the error drift is limited after 48 hours of sampling.

Spatially Resolved Sensors

Advantageously, the temperature sensor of the invention comprises means for spatially resolving the temperature variation. Four different techniques are available.

Patched Fibre Technique

Figure 18:
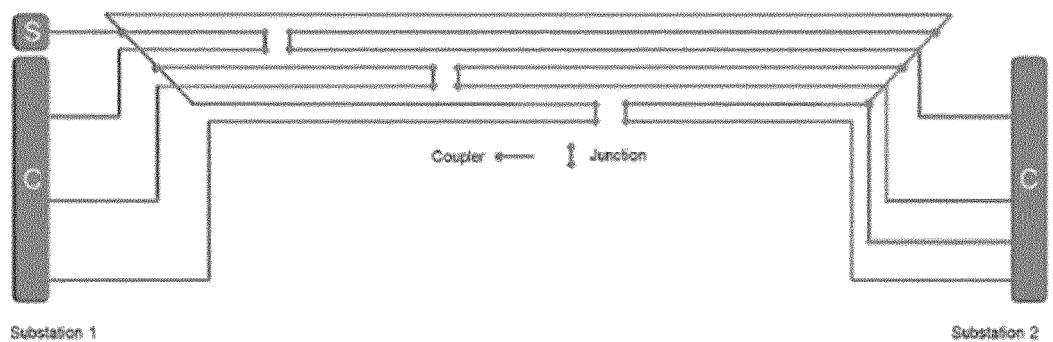
FIG. 18 represents a bundle of optical fibre for implementing a patched fibre technique.

This technique is represented in FIG. 18. One laser source and mode filtering device (S) is placed in a substation at one end of a fibre bundle composed of several fibres. Light is transmitted through N−1 fibres by couplers. N junctions are done in junction chambers placed all along the cable. Outgoing interference pattern from N fibres are preferably projected on 2 cameras. One is localized in substation 1, the other localized in substation 2. It is important to notice that patterns can be projected simultaneously on each camera. This means that several speckle can coexist on the same image/movie. A low-cost 5 Mpixels CMOS sensor (C) is, for example, able to sense at least 12 pattern fields originating from 12 different optical fibres ends. This technique is able to monitor separately N+1 sections by 2.N +1 fibres.

Cut Fibre Technique

Figure 19:
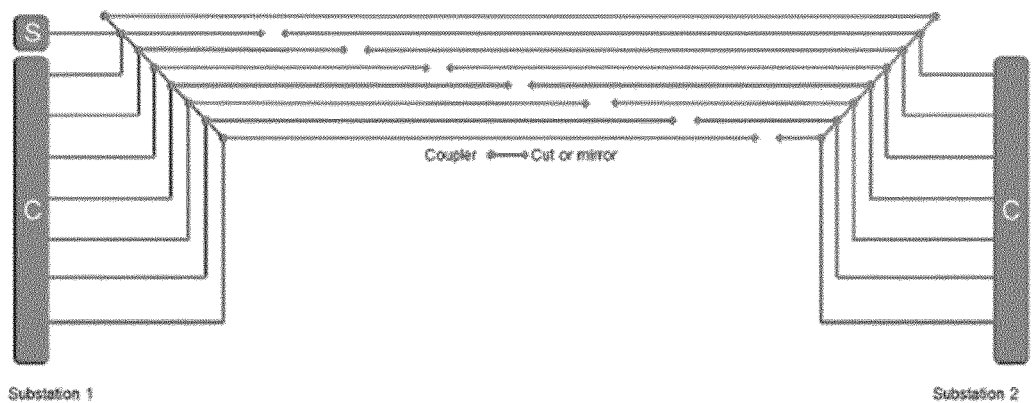
FIG. 19 represents a bundle of optical fibre for implementing a cut fibre technique.

Tests achieved at 850 nm on a G.652 fibre shows that very little power is required to make conventional CMOS camera efficient. As shown in FIG. 19, reflection setup and replacement of junction by cut allow to decrease the required number of fibre for the same number of section. In this setup interference pattern can be projected on one or 2 cameras. N fibres are required to monitor N sections. A clean fibre cut is easier to achieve than a junction. A back-reflector or a mirror can also be used. For each section, this technique implies at least 14 dB loss for the cut and a 2 times 3 dB loss for the two passes in the couplers, 20 dB in total. Use of back-reflectors can lower this value to less than 10 dB.

Multiple Refection

Figure 20:
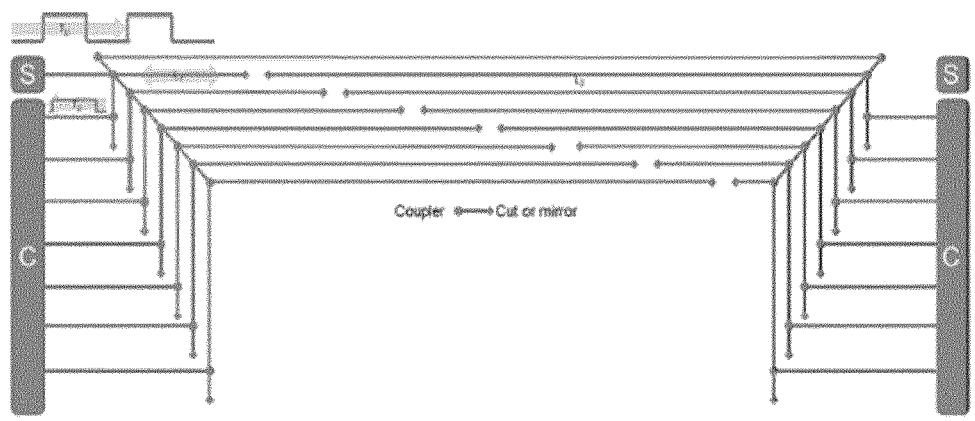
FIG. 20 represents a bundle of optical fibre for implementing a multiple reflection technique.
Figure 21:
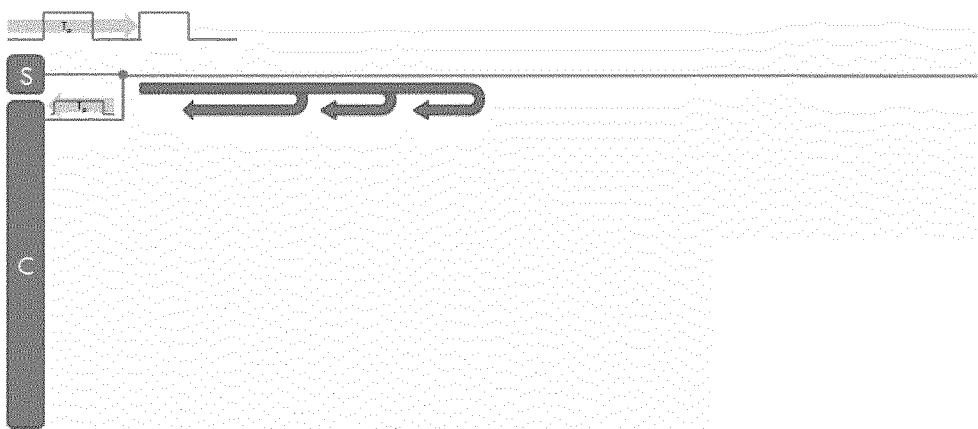
FIG. 21 represents a bundle of optical fibre for implementing a back-scattering technique.

Multiple reflection setup is described in FIG. 20. In order to improve sensitivity of the technique, multiple refection can be used as follow. A light pulse of Tp duration is launched in the fibre bundle. This pulse is reflected to the CMOS camera after a L1/v lapse of time. For a 100 m long section, this takes about 1 µs, back and forth trajectory. If we place a mirror at the substation and consider R reflections in this section, pulse is observed after R µs. If we synchronize the CMOS camera on this arrival time and if pulse length is less than R µs, pattern sensitivity is amplified with a R factor. Reflection losses limit R. Use of low-losses mirrors allows 10 reflections to be done with a 100 mW source (Laser) and a conventional CMOS sensor. This means that sensitivity could be improved by a 10 factor.

Back-Scattering

Back-scattering setup is described in FIG. 20. In this setup a pulse is launched at the proximal end of the fibre. Part of the light power is scattered back to the proximal end. Localization of an event is enabled by proper synchronization between the trigger of the launched pulse and the camera.

The invention claimed is:

1. Method for determining an average distributed temperature variation of a few mode optical fibre comprising the steps of:
   providing a few mode optical fibre;
   enlighting a first end of said few mode optical fibre by means of a coherent light source;
   determining the intermodal interference pattern of coherent light at a second end of the optical fibre;
   selecting one maximum of intensity of the intermodal interference pattern at the second end of the optical fibre by spatially mode filtering the enlighting at the first end of the optical fibre;
   determining the path length of the trajectory of the selected maximum of intensity of the intermodal interference pattern;
   based upon the determined path length of the trajectory of the selected maximum of intensity, determining the average distributed temperature variation of the few mode optical fibre.

2. The method according to claim 1 wherein the sign of the average distributed temperature variation is determined by measuring the trajectory of the selected maximum of intensity induced by a cyclically heated and cooled fibre section inserted in series in the optical path of the few mode optical fibre.

3. The method of claim 1 comprising the step of filtering the path length of the maximum of intensity for suppressing discontinuity of the trajectory induced by vibrations.

4. The method of claim 1 wherein the optical fibre is a monomode fibre at higher wavelengths than a specified wavelength, the coherent light source having a wavelength shorter than said specified wavelength.

5. The method of claim 1 wherein the interference pattern is determined by a camera sensor.

6. The method of claim 5 wherein the camera sensor is a CMOS camera.

7. The method of claim 1 comprising the step of temporally integrating the average distributed temperature variation for determining a spatially integrated temperature of the fibre.

8. The method of claim 1 wherein the fibre comprises a cut or a coupler at a known distance between the proximal and the distal ends, said coupler or cut defining a first and a second fibre portion for determining a temperature variation of the first and second portion of the fibre by measuring the path length(s) of the trajectory of the selected maximum of intensity at both the proximal and the distal ends of the fibre.

9. The method of claim 8 wherein more than one fibre comprising a cut or a coupler are used, the cut or coupler being disposed at different distance of the proximal end, the trajectories of the selected maximum at both ends of each fibre being determined for determining a spatial distribution of the temperature variation.

10. The method according to claim 1, wherein the average distributed temperature variation is determined along an elongated object.

11. The method according to claim 10 wherein the elongated object is selected from the group consisting of an electric cable, and a gas pipe.

12. Integrated temperature sensor for implementing the method of claim 1 comprising:
    a coherent light source;
    an optical fibre exhibiting a few mode behaviour at the wavelength of the coherent light source, the proximal end of said optical fibre being optically connected to the coherent light source;
    a spatial filter for selecting a few mode propagation inducing one single light intensity maximum or two light intensity maxima at the distal end of the optical fibre;
    means for determining in use the path length of said intensity maximum.

* * * * *